US012574499B2

(12) United States Patent
Park et al.

(10) Patent No.: US 12,574,499 B2
(45) Date of Patent: Mar. 10, 2026

(54) VIDEO ENCODING/DECODING METHOD AND APPARATUS

(71) Applicants: HYUNDAI MOTOR COMPANY, Seoul (KR); KIA CORPORATION, Seoul (KR)

(72) Inventors: Seung Wook Park, Yongin-si (KR); Jin Heo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 41 days.

(21) Appl. No.: 18/400,465

(22) Filed: Dec. 29, 2023

(65) Prior Publication Data

US 2024/0137490 A1 Apr. 25, 2024
US 2024/0236301 A9 Jul. 11, 2024

Related U.S. Application Data

(63) Continuation of application No. PCT/KR2022/008211, filed on Jun. 10, 2022.

(30) Foreign Application Priority Data

Jun. 29, 2021 (KR) ........................ 10-2021-0084455
Jun. 9, 2022 (KR) ........................ 10-2022-0069950

(51) Int. Cl.
*H04N 19/105* (2014.01)
*H04N 19/176* (2014.01)

(52) U.S. Cl.
CPC ......... *H04N 19/105* (2014.11); *H04N 19/176* (2014.11)

(58) Field of Classification Search
CPC .... H04N 19/176; H04N 19/52; H04N 19/105; H04N 19/159; H04N 19/70;
(Continued)

(56) References Cited

U.S. PATENT DOCUMENTS 10,958,934 B2 3/2021 Li et al.
11,297,330 B2 4/2022 Zhao et al.
(Continued)

FOREIGN PATENT DOCUMENTS

KR 20200034640 A 3/2020
KR 20210032535 A 3/2021
(Continued)

OTHER PUBLICATIONS

International Search Report and Written Opinion cited in corresponding international patent application No. PCT/KR2022/008211; Sep. 23, 2022; 15 pp.

*Primary Examiner* — Anner Holder
(74) *Attorney, Agent, or Firm* — Lempia Summerfield Katz LLC

(57) ABSTRACT

A video encoding/decoding method and apparatus are provided. A video decoding method includes deriving a spatial merge candidate, based on neighboring blocks spatially adjacent to a current block. The method also includes deriving a temporal merge candidate, based on neighboring blocks temporally adjacent to the current block. The method also includes generating a first merge candidate list based on the spatial merge candidate and the temporal merge candidate. The method also includes deriving a history-based merge candidate, based on motion information of a block encoded before the current block. The method also includes generating a second merge candidate list, based on the first merge candidate list and the history-based merge candidate. The method also includes generating a prediction block of the current block, based on the second merge candidate list. The first merge candidate list and the second merge candidate list are generated based on a priority of motion information.

18 Claims, 18 Drawing Sheets

(58) Field of Classification Search
CPC .. H04N 19/513; H04N 19/132; H04N 19/109; H04N 19/137; H04N 19/119; H04N 19/46; H04N 19/139; H04N 19/184; H04N 19/147; H04N 19/13; H04N 19/577; H04N 19/51; H04N 19/91; H04N 19/103; H04N 19/463; H04N 19/56; H04N 19/96; H04N 19/436; H04N 19/503; H04N 19/507; H04N 19/54; H04N 19/11; H04N 19/44; H04N 19/523; H04N 19/107; H04N 19/122; H04N 19/124; H04N 19/157; H04N 19/527; H04N 19/167; H04N 19/186; H04N 19/42; H04N 19/573; H04N 19/593; H04N 19/61; H04N 19/82; H04N 19/117; H04N 19/126; H04N 19/129; H04N 19/136; H04N 19/14; H04N 19/166; H04N 19/172; H04N 19/174; H04N 19/182; H04N 19/19; H04N 19/423; H04N 19/517; H04N 19/521; H04N 19/533; H04N 19/583; H04N 19/587; H04N 19/59; H04N 19/60; H04N 19/615; H04N 19/62; H04N 19/65
See application file for complete search history.

(56) References Cited

U.S. PATENT DOCUMENTS

| | | | | |
|---|---|---|---|---|
| 11,546,626 | B2 * | 1/2023 | Gao | ........................ H04N 19/70 |
| 11,616,946 | B2 | 3/2023 | Kang et al. | |
| 11,818,383 | B2 * | 11/2023 | Chiang | ................ H04N 19/513 |
| 2020/0036997 | A1 | 1/2020 | Li et al. | |
| 2020/0112739 | A1 * | 4/2020 | Xu | ......................... H04N 19/70 |
| 2020/0137398 | A1 | 4/2020 | Zhao et al. | |
| 2020/0169745 | A1 * | 5/2020 | Han | ..................... H04N 19/176 |
| 2021/0352274 | A1 | 11/2021 | Kang et al. | |
| 2022/0217361 | A1 | 7/2022 | Zhao et al. | |
| 2023/0199174 | A1 | 6/2023 | Kang et al. | |

FOREIGN PATENT DOCUMENTS

| | | |
|---|---|---|
| KR | 20210063276 A | 6/2021 |
| WO | 2020056143 A1 | 3/2020 |

* cited by examiner

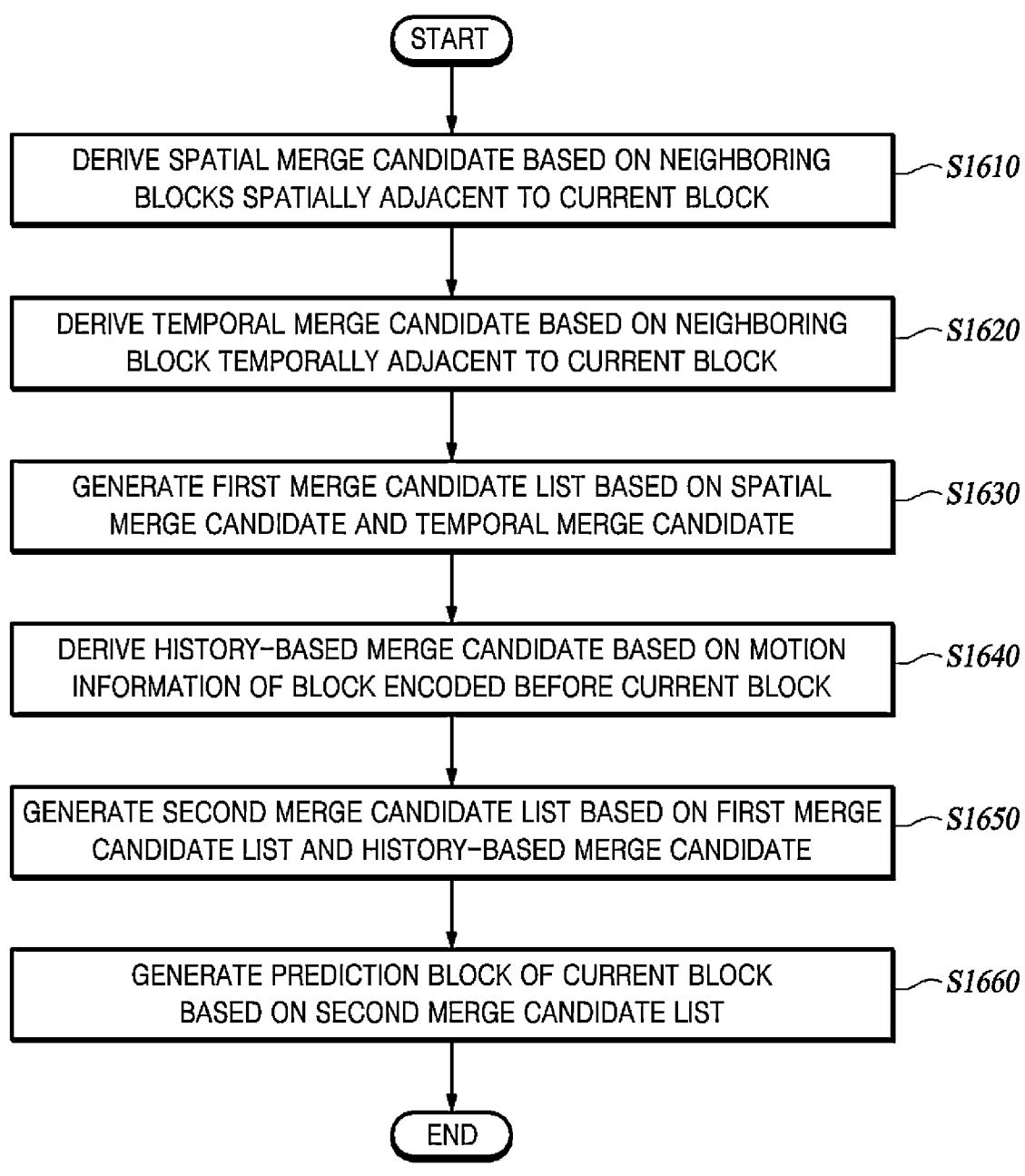

START

DERIVE SPATIAL MERGE CANDIDATE BASED ON NEIGHBORING BLOCKS SPATIALLY ADJACENT TO CURRENT BLOCK — S1610

DERIVE TEMPORAL MERGE CANDIDATE BASED ON NEIGHBORING BLOCK TEMPORALLY ADJACENT TO CURRENT BLOCK — S1620

GENERATE FIRST MERGE CANDIDATE LIST BASED ON SPATIAL MERGE CANDIDATE AND TEMPORAL MERGE CANDIDATE — S1630

DERIVE HISTORY-BASED MERGE CANDIDATE BASED ON MOTION INFORMATION OF BLOCK ENCODED BEFORE CURRENT BLOCK — S1640

GENERATE SECOND MERGE CANDIDATE LIST BASED ON FIRST MERGE CANDIDATE LIST AND HISTORY-BASED MERGE CANDIDATE — S1650

GENERATE PREDICTION BLOCK OF CURRENT BLOCK BASED ON SECOND MERGE CANDIDATE LIST — S1660

END

*FIG. 16*

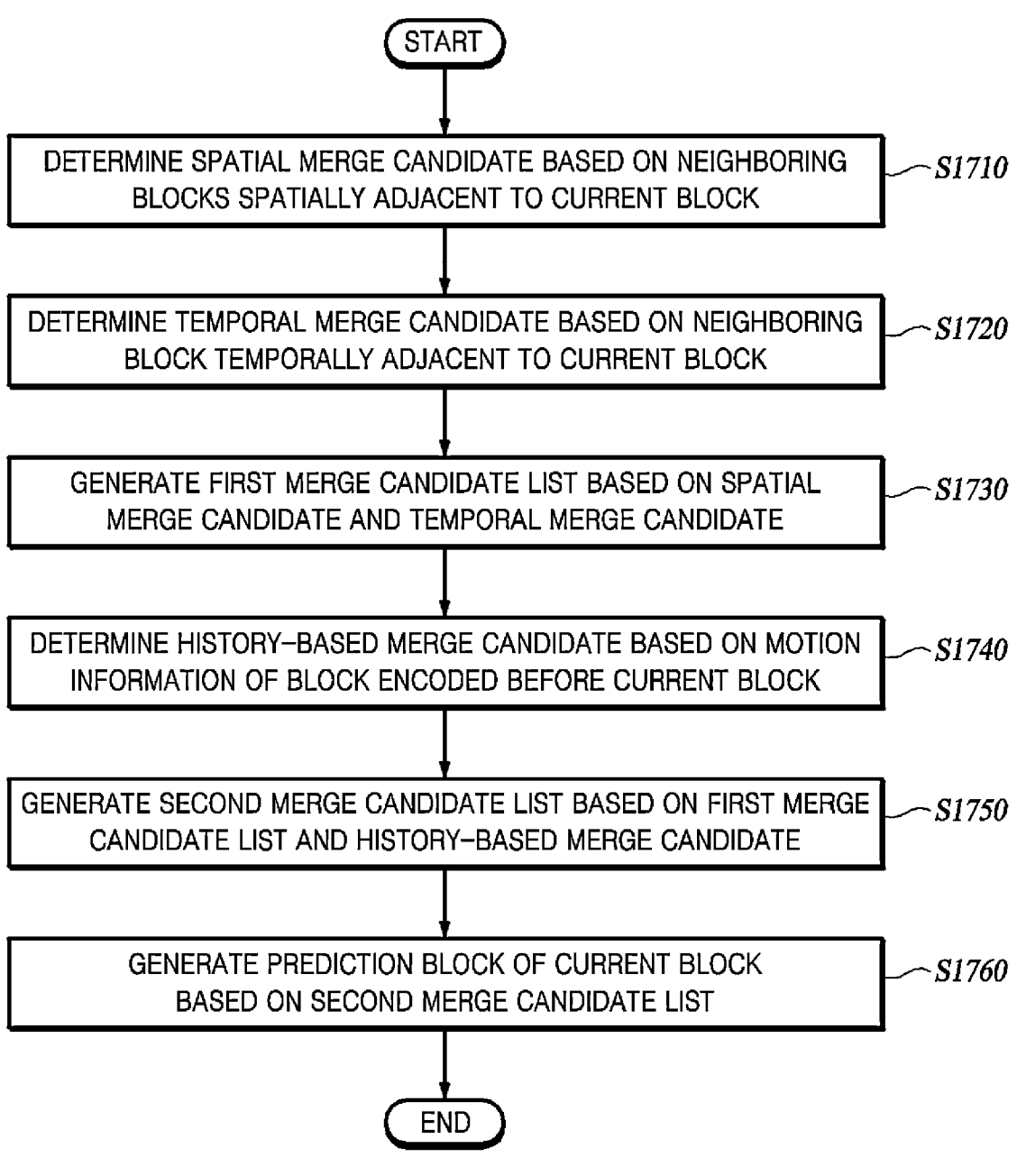

START

DETERMINE SPATIAL MERGE CANDIDATE BASED ON NEIGHBORING BLOCKS SPATIALLY ADJACENT TO CURRENT BLOCK — *S1710*

DETERMINE TEMPORAL MERGE CANDIDATE BASED ON NEIGHBORING BLOCK TEMPORALLY ADJACENT TO CURRENT BLOCK — *S1720*

GENERATE FIRST MERGE CANDIDATE LIST BASED ON SPATIAL MERGE CANDIDATE AND TEMPORAL MERGE CANDIDATE — *S1730*

DETERMINE HISTORY–BASED MERGE CANDIDATE BASED ON MOTION INFORMATION OF BLOCK ENCODED BEFORE CURRENT BLOCK — *S1740*

GENERATE SECOND MERGE CANDIDATE LIST BASED ON FIRST MERGE CANDIDATE LIST AND HISTORY–BASED MERGE CANDIDATE — *S1750*

GENERATE PREDICTION BLOCK OF CURRENT BLOCK BASED ON SECOND MERGE CANDIDATE LIST — *S1760*

END

*FIG. 17*

VIDEO ENCODING/DECODING METHOD AND APPARATUS

CROSS-REFERENCE TO RELATED APPLICATIONS

This application is a Continuation of International Application No. PCT/KR2022/008211 filed on Jun. 10, 2022, which claims priority to Korean Patent Application No. 10-2021-0084455 filed on Jun. 29, 2021, and Korean Patent Application No. 10-2022-0069950 filed on Jun. 9, 2022, the entire disclosures of each of which are incorporated herein by reference.

TECHNICAL FIELD

The present disclosure relates to a video encoding/decoding method and a video encoding/decoding apparatus. More specifically, the present disclosure relates to a video encoding/decoding method and a video encoding/decoding apparatus that configure a merge candidate list through a redundancy check and perform motion compensation.

BACKGROUND

The contents described below simply provide background information related to the present embodiment and do not constitute prior art.

Since the volume of video data is larger than the volume of voice data or still image data, storing or transmitting video data without processing the video data by compression requires a lot of hardware resources including memory.

Accordingly, in storing or transmitting video data, the video data is generally compressed using an encoder so as to be stored or transmitted. Then, a decoder receives the compressed video data and decompresses and reproduces the video data. Compression techniques for such video data include H.264/AVC, high efficiency video coding (HEVC), and versatile video coding (VVC), which improves coding efficiency by about 30% or more compared to HEVC.

However, the video size, resolution, and frame rate are gradually increasing, and thus the amount of data to be encoded is also increasing. Accordingly, a new compression technique having better encoding efficiency and higher image quality than the existing compression technique is required.

Inter prediction refers to generating a prediction block of a current block from a picture coded at a previous time. A merge mode is a technology that derives a reference direction, a reference picture index, and a motion vector prediction value from neighboring blocks. In inter prediction, a merge candidate list is configured, and motion information of a specific candidate indicated by a transmitted index in the configured merge candidate list is used as motion information of the current block. Motion compensation is performed using the corresponding motion information, and a prediction block of the current block is generated. In the case of configuring a merge candidate list, it is necessary to improve coding efficiency by configuring candidates efficiently.

SUMMARY

An object of the present disclosure is to provide a method and an apparatus for efficiently configuring a merge candidate list.

Another object of the present disclosure is to provide a method and an apparatus for configuring a merge candidate list using a priority-based spatial merge candidate.

Another object of the present disclosure is to provide a method and an apparatus for deriving a spatial merge candidate by considering zero motion information.

Another object of the present disclosure is to provide a method and an apparatus for managing a history-based merge candidate buffer for each coding tree unit line.

Another object of the present disclosure is to provide a method and an apparatus for configuring a merge candidate list through a redundancy check.

Another object of the present disclosure is to provide a method and an apparatus for improving video encoding/decoding efficiency.

Another object of the present disclosure is to provide a recording medium that stores a bitstream generated by a video encoding/decoding method or a video encoding/decoding apparatus of the present disclosure.

Another object of the present disclosure is to provide a method and an apparatus for transmitting a bitstream generated by a video encoding/decoding method or an apparatus of the present disclosure.

According to a present disclosure, a video decoding method includes deriving a spatial merge candidate, based on neighboring blocks spatially adjacent to a current block. The video decoding method also includes deriving a temporal merge candidate, based on neighboring blocks temporally adjacent to the current block. The video decoding method also includes generating a first merge candidate list based on the spatial merge candidate and the temporal merge candidate. The video decoding method also includes deriving a history-based merge candidate, based on motion information of a block encoded before the current block. The video decoding method also includes generating a second merge candidate list, based on the first merge candidate list and the history-based merge candidate. The video decoding method also includes generating a prediction block of the current block, based on the second merge candidate list. The first merge candidate list and the second merge candidate list are generated based on a priority of motion information.

In the video decoding method according to the present disclosure, deriving the spatial merge candidate includes generating a motion information list, based on motion information of the neighboring blocks spatially adjacent to the current block and a frequency of occurrence of the motion information of the neighboring blocks spatially adjacent to the current block.

In the video decoding method according to the present disclosure, generating the first merge candidate list includes generating the first merge candidate list by adding motion information, starting from motion information with a high priority in the motion information list.

In the video decoding method according to the present disclosure, deriving the spatial merge candidate includes deriving the spatial merge candidate by considering motion information of the neighboring blocks spatially adjacent to the current block as zero motion information, based on that the motion information of the neighboring blocks spatially adjacent to the current block is not available.

In the video decoding method according to the present disclosure, generating the first merge candidate list includes generating the first merge candidate list, based on a priority of the zero motion information.

In the video decoding method according to the present disclosure, deriving the history-based merge candidate includes searching surrounding regions of the neighboring blocks temporally adjacent to the current block in a random order. Deriving the history-based merge candidate also includes s configuring a buffer, based on motion information in the surrounding regions and a frequency of occurrence of the motion information in the surrounding regions.

In the video decoding method according to the present disclosure, generating the second merge candidate includes comparing motion information in the first merge candidate list with motion information of the history-based merge candidate. Generating the second merge candidate also includes changing a position of motion information in the second merge candidate list, based on that the motion information in the first merge candidate list and the motion information of the history-based merge candidate are the same.

In the video decoding method according to the present disclosure, the video decoding method further includes when all merge candidates in the second merge candidate list are not filled based on the first merge candidate list and the history-based merge candidate, deriving a pairwise average merge candidate. The video decoding method further includes adding the pairwise average merge candidate to the second merge candidate list.

In the video decoding method according to the present disclosure, the video decoding method further includes when all merge candidates in the second merge candidate list are not filled based on the first merge candidate list, the history-based merge candidate, and the pairwise average merge candidate, deriving a zero motion vector merge candidate. The video decoding method further includes adding the zero motion vector merge candidate to the second merge candidate list.

In the video decoding method according to the present disclosure, the priority of the motion information is determined based on a frequency of occurrence of the motion information.

According to the present disclosure, a video encoding method includes determining a spatial merge candidate, based on neighboring blocks spatially adjacent to a current block. The video encoding method also includes determining a temporal merge candidate, based on neighboring blocks temporally adjacent to the current block. The video encoding method also includes generating a first merge candidate list based on the spatial merge candidate and the temporal merge candidate. The video encoding method also includes determining a history-based merge candidate, based on motion information of a block encoded before the current block. The video encoding method also includes generating a second merge candidate list, based on the first merge candidate list and the history-based merge candidate. The video encoding method also includes generating a prediction block of the current block, based on the second merge candidate list. The first merge candidate list and the second merge candidate list are generated based on a priority of motion information.

In the video encoding method according to the present disclosure, determining the spatial merge candidate includes generating a motion information list, based on motion information of the neighboring blocks spatially adjacent to the current block and a frequency of occurrence of the motion information of the neighboring blocks spatially adjacent to the current block.

In the video encoding method according to the present disclosure, generating the first merge candidate list includes generating the first merge candidate list by adding motion information, starting from motion information with a high priority in the motion information list.

In the video encoding method according to the present disclosure, determining the spatial merge candidate includes determining the spatial merge candidate by considering motion information of the neighboring blocks spatially adjacent to the current block as zero motion information, based on that the motion information of the neighboring blocks spatially adjacent to the current block is not available.

In the video encoding method according to the present disclosure, generating the first merge candidate list includes generating the first merge candidate list, based on a priority of the zero motion information.

In the video encoding method according to the present disclosure, determining the history-based merge candidate includes searching surrounding regions of the neighboring blocks temporally adjacent to the current block in a random order. Determining the history-based merge candidate also includes configuring a buffer, based on motion information in the surrounding regions and a frequency of occurrence of the motion information in the surrounding regions.

In the video encoding method according to the present disclosure, generating the second merge candidate list includes comparing motion information in the first merge candidate list with motion information of the history-based merge candidate. Generating the second merge candidate list also includes changing a position of motion information in the second merge candidate list, based on that the motion information in the first merge candidate list and the motion information of the history-based merge candidate are the same.

In the video encoding method according to the present disclosure, the video encoding method further includes when all merge candidates in the second merge candidate list are not filled based on the first merge candidate list and the history-based merge candidate, determining a pairwise average merge candidate. The video encoding method further includes adding the pairwise average merge candidate to the second merge candidate list.

In the video encoding method according to the present disclosure, the video encoding method further includes when all merge candidates in the second merge candidate list are not filled based on the first merge candidate list, the history-based merge candidate, and the pairwise average merge candidate, determining a zero motion vector merge candidate. The video encoding method further includes adding the zero motion vector merge candidate to the second merge candidate list.

In addition, according to the present disclosure, it is possible to provide a method of transmitting a bitstream generated by the video encoding method or the video encoding apparatus according to the present disclosure.

In addition, according to the present disclosure, it is possible to provide a recording medium storing a bitstream generated by the video encoding method or apparatus according to the present disclosure.

In addition, according to the present disclosure, it is possible to provide a recording medium storing a bitstream received and decoded by the video decoding apparatus according to the present disclosure and used to reconstruct a video.

According to the present disclosure, the method and an apparatus for efficiently configuring a merge candidate list may be provided.

In addition, according to the present disclosure, the method and an apparatus for configuring a merge candidate list using a priority-based spatial merge candidate may be provided.

In addition, according to the present disclosure, the method and an apparatus for deriving a spatial merge candidate by considering zero motion information may be provided.

In addition, according to the present disclosure, the method and an apparatus for managing a history-based merge candidate buffer for each coding tree unit line may be provided.

In addition, according to the present disclosure, the method and an apparatus for configuring a merge candidate list through a redundancy check may be provided.

In addition, according to the present disclosure, the method and an apparatus for improving video encoding/decoding efficiency may be provided.

The effects that may be obtained from the present disclosure are not limited to the effects mentioned above. Other effects not mentioned may be clearly understood by those having ordinary skill in the art from the description below.

BRIEF DESCRIPTION OF DRAWINGS

FIG. 16 is a diagram illustrating a video decoding process, according to an embodiment of the present disclosure.

FIG. 17 is a diagram illustrating a video encoding process, according to an embodiment of the present disclosure.

DETAILED DESCRIPTION

Figure 1:
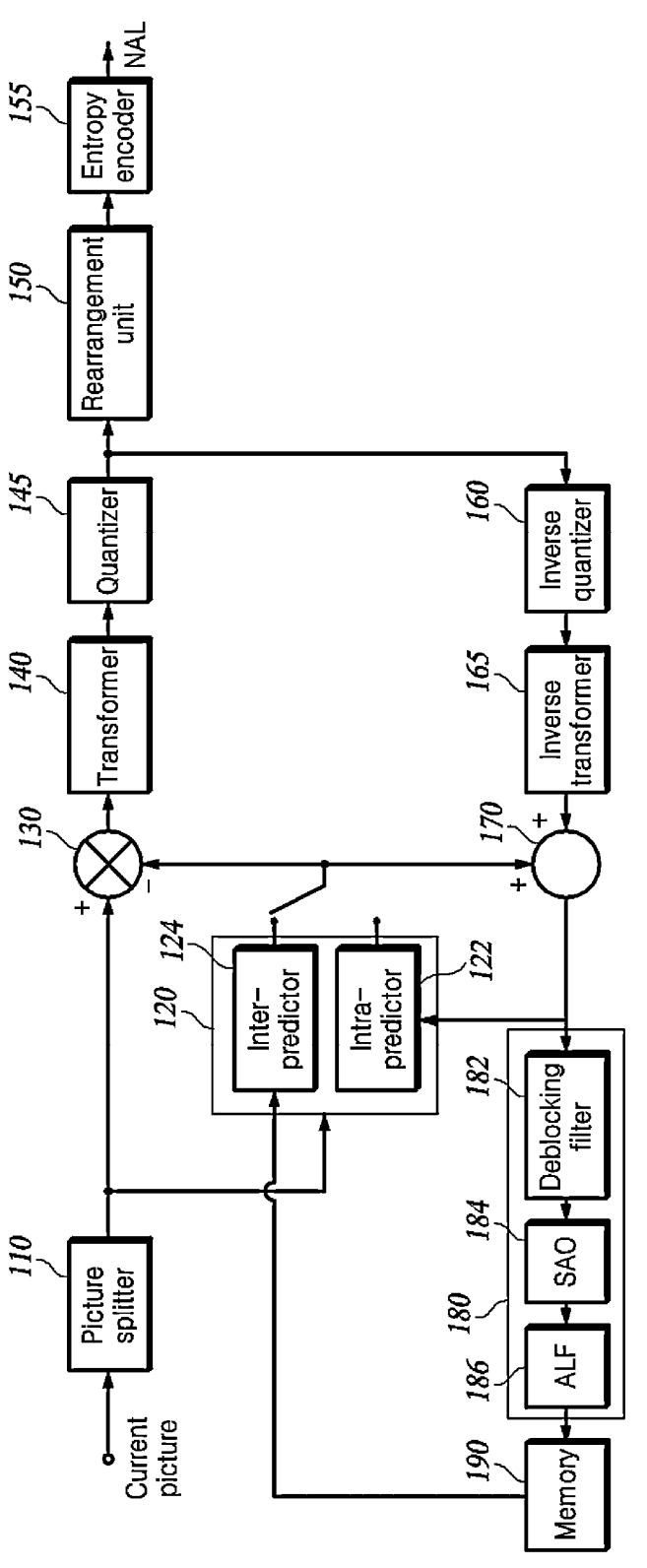
FIG. 1 is a block diagram of a video encoding apparatus that may implement a technology of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
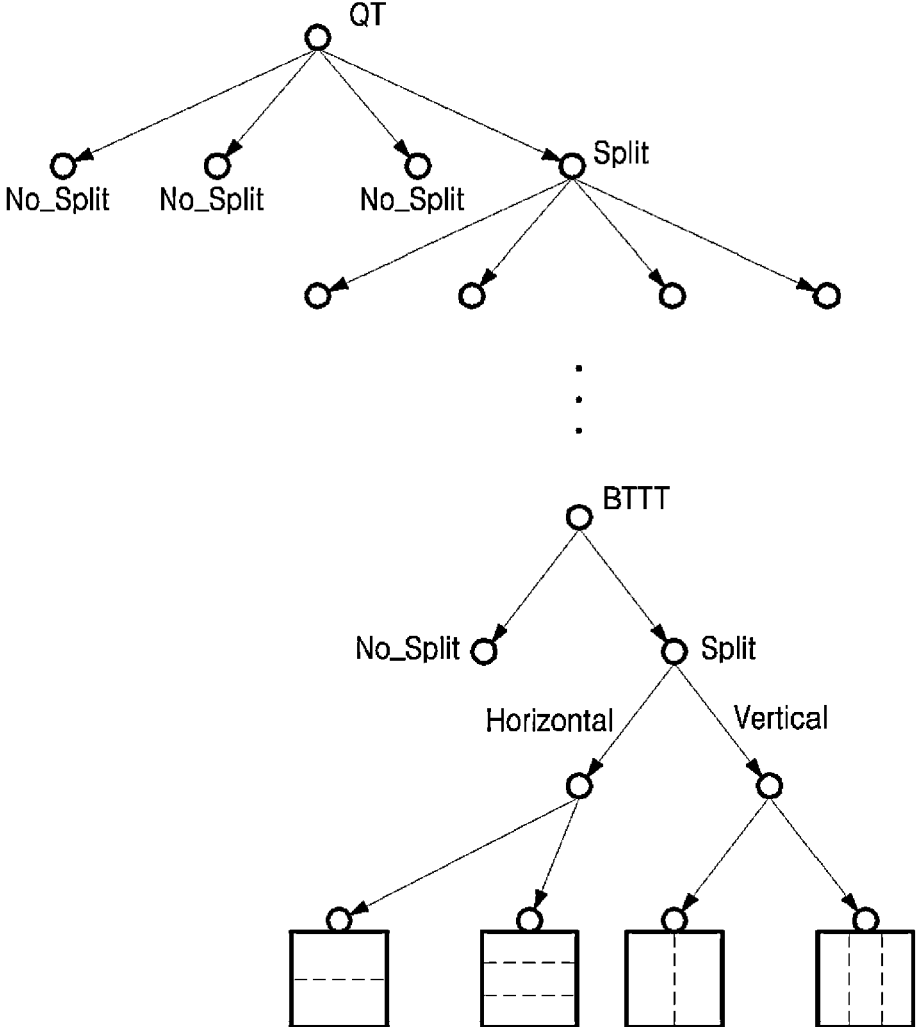
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
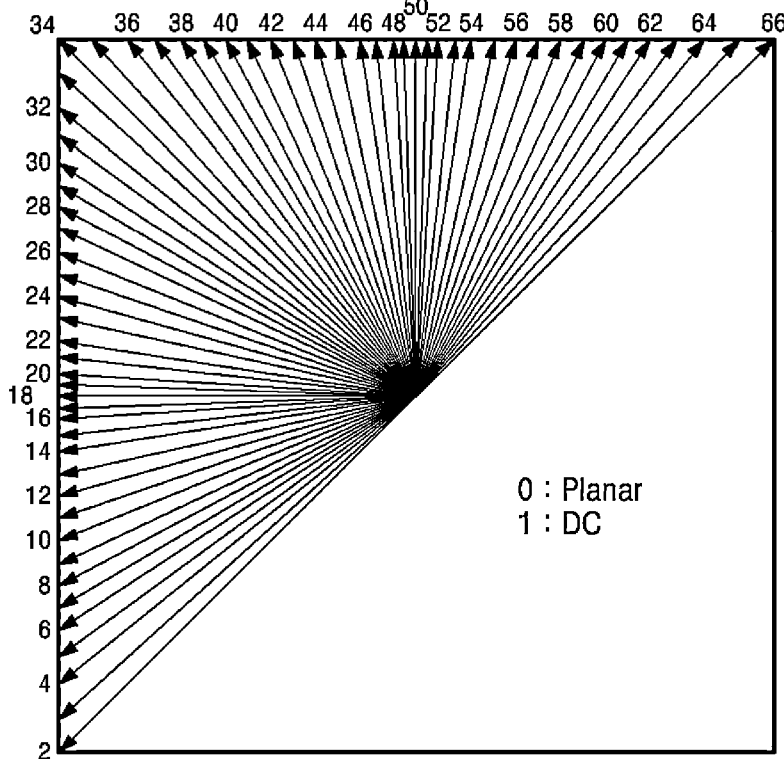
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
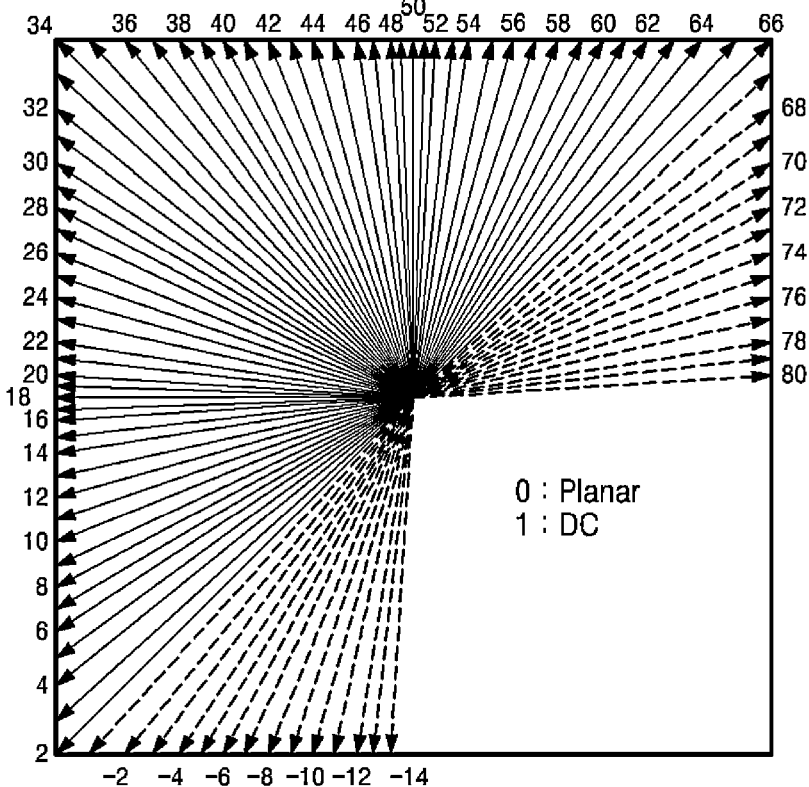

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
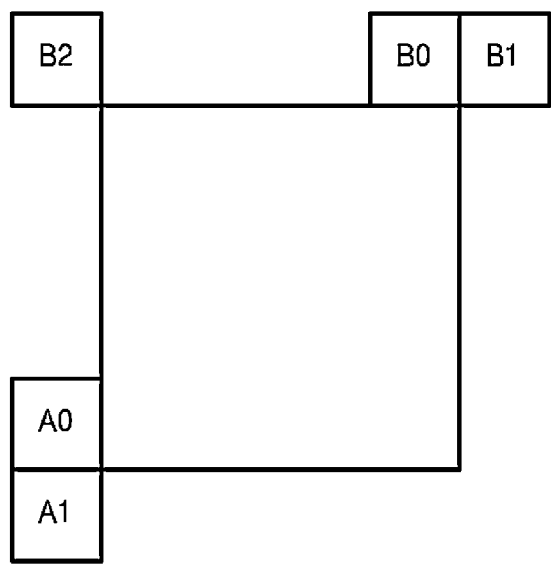
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be obtained by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
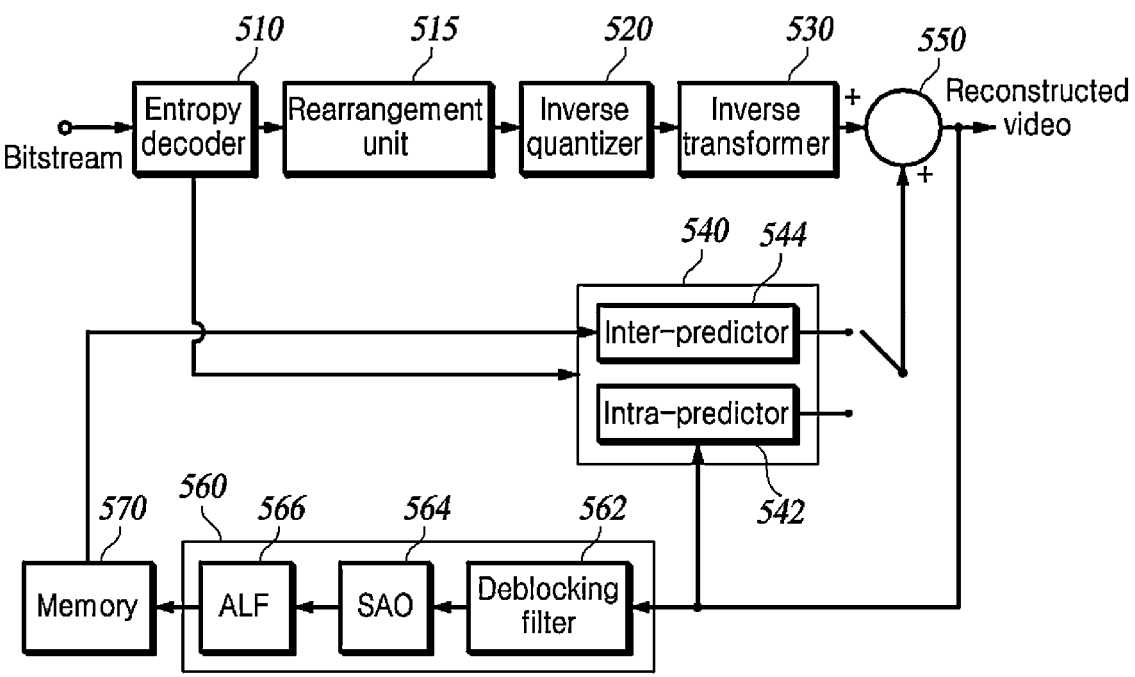
FIG. 5 is a block diagram of a video decoding apparatus that may implement technologies of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

Figure 6:
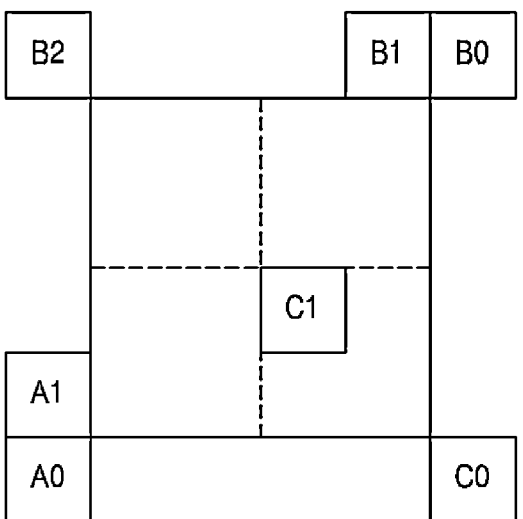
FIG. 6 is a diagram illustrating positions of spatial and temporal neighboring blocks of a current block, according to an embodiment of the present disclosure.

FIG. 6 is a diagram illustrating locations of spatial and temporal neighboring blocks of the current block, according to an embodiment of the present disclosure. Inter-screen prediction may have the same meaning as inter prediction. In inter prediction, a merge candidate list may be configured, and motion information of a specific candidate indicated by a transmitted index among the configured candidates may be used as motion information of a current block. Motion compensation may be performed using motion information. The merge candidate list may be configured in the order of spatial merge candidates, temporal merge candidates, history-based merge candidates, pairwise average merge candidates, and zero motion vector merge candidates. The maximum number of candidates in the merge candidate list may be derived from information transmitted in a sequence parameter set (SPS). The merge candidate list may be configured using up to six candidates. However, the present disclosure is not limited to the present embodiment and any number of merge candidate lists may be configured. Referring to the spatial merge candidate deriving method, neighboring blocks adjacent to a current block may be searched in a set order. Information on blocks that may be used as merge candidates may be sequentially added to the merge candidate list.

Spatial merge candidates may be derived from up to four merge candidates from five neighboring blocks of the current block. Up to four merge candidates may be added to the merge candidate list. At this time, if the neighboring block is an intra prediction mode, intra block copy mode (IBC), or palette mode, different from the current block, such as intra prediction mode, the information of the neighboring block may not be added to the merge candidate list. If the neighboring block exists in another parallel merging region or has the same motion information as that of a previous neighboring block, the information of the neighboring block may not be added to the merge candidate list.

Referring to FIG. 6, neighboring blocks A0, A1, B0, B1, and B2 may exist around the current block. To derive spatial merge candidates, neighboring blocks may be searched in the order of block B1, block A1, block B0, block A0, and block B2. Among the information on neighboring blocks searched in the corresponding order, information that may be used as a merge candidate may be sequentially added to the merge candidate list. Up to four merge candidates may be derived from blocks A0, A1, B0, B1, and B2 and added to the merge candidate list. A temporal merge candidate may be selected as information on one of block C0 or block C1 based on the same position as the current block. If there is no motion information in the block C0 that may be used as a temporal merge candidate, the block C1 may be additionally searched.

Figure 7:
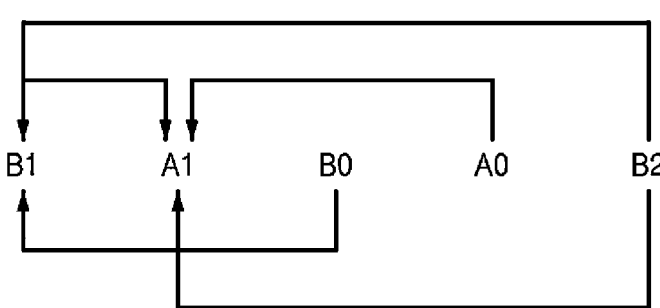
FIG. 7 is a diagram illustrating a redundancy check of spatial merge candidates, according to an embodiment of the present disclosure.

FIG. 7 is a diagram illustrating a redundancy check of a spatial merge candidate according to an embodiment of the present disclosure. The redundancy check may be performed to determine whether there is overlapping motion information between information in the merge candidate list and information in the spatial merge candidate. Through the redundancy check, merge candidates with the same motion information may not be added to the merge candidate list. To reduce the complexity of the redundancy check, the redundancy check may not be performed on all spatial merge candidates.

Referring to FIG. 7, spatial merge candidates A0, A1, B0, B1, and B2 may be derived from blocks A0, A1, B0, B1, and B2, which are neighboring blocks adjacent to the current block, respectively. The redundancy check may not be performed on all spatial merge candidates A0, A1, B0, B1, and B2. The redundancy check may be performed on spatial merge candidates B1 and A1, spatial merge candidates B1 and B0, and spatial merge candidates B1 and B2. The redundancy check may be performed on spatial merge candidates A1 and A0 and spatial merge candidates A1 and B2. However, the present disclosure is not limited to the present embodiment, and the redundancy check of spatial merge candidates may be performed in other combinations.

Figure 8:
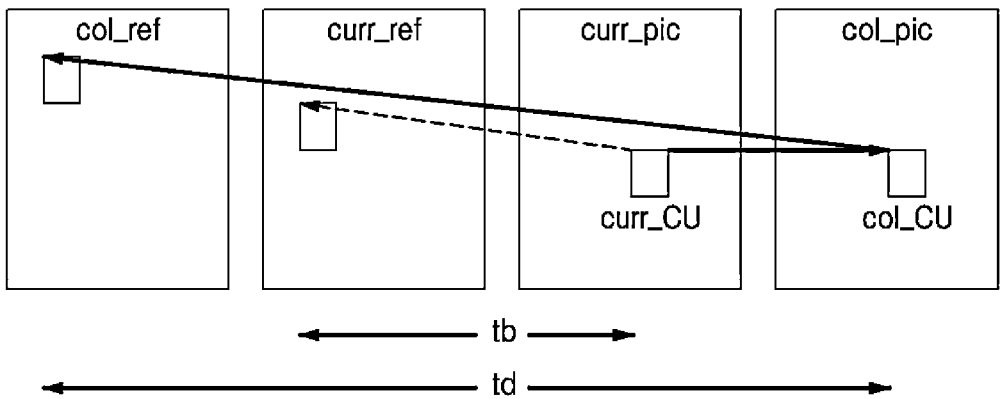
FIG. 8 is a diagram illustrating motion vector scaling for temporal merge candidates, according to an embodiment of the present disclosure.

FIG. 8 is a diagram illustrating motion vector scaling for a temporal merge candidate according to an embodiment of the present disclosure. A temporal merge candidate may be derived from a temporal neighboring block to a maximum of one merge candidate. Temporal merge candidates may be derived by scaling the motion information of temporal neighboring blocks. A motion vector having a distance between a reference picture in which a temporal neighboring block exists, and a reference picture indicated by the motion information of the temporal neighboring block may be scaled to have a distance between the current picture and the reference picture of the current picture. Indicator information indicating a reference picture including a temporal neighboring block and indicator information indicating a reference picture list direction of a reference picture including a temporal neighboring block may be derived from a picture header and a slice header.

Referring to FIG. 8, a distance between a reference picture col_pic in which a temporal neighboring block col_CU exists and a reference picture col_ref indicated by the temporal neighboring block col_CU may correspond to td. A distance between the current picture curr_pic in which a current block curr_CU exists and a reference picture curr_ref of the current picture curr_pic may correspond to tb. A motion vector with a distance td may be scaled to have a distance tb.

Figure 9:
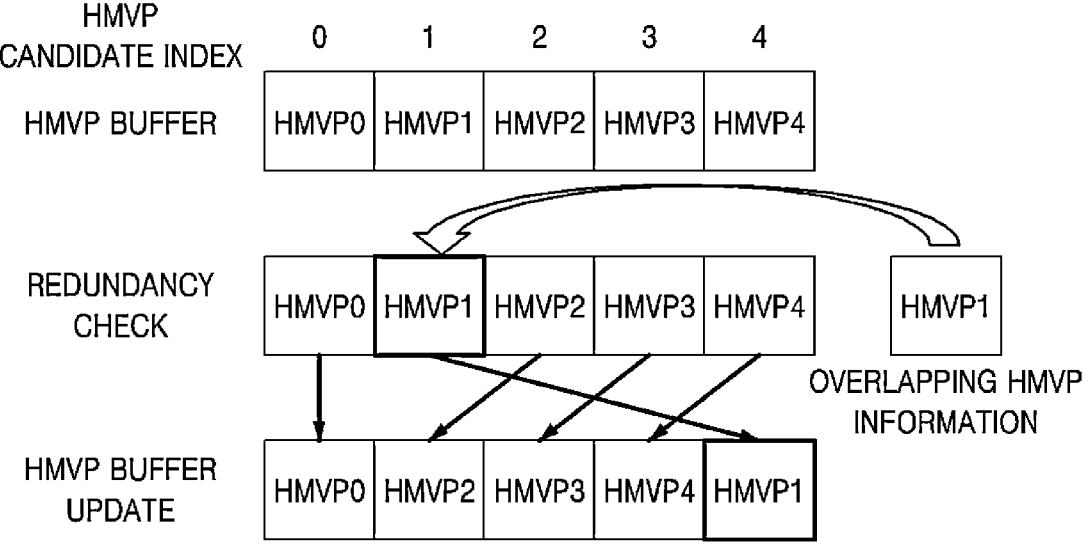
FIG. 9 is a diagram illustrating a buffer management process of a history-based merge candidate, according to an embodiment of the present disclosure.

FIG. 9 is a diagram illustrating a buffer management process of a history-based merge candidate, according to an embodiment of the present disclosure. The history-based merge candidate (history-based motion vector prediction (HMVP)) deriving method may correspond to a method of configuring a merge candidate list using motion information of a previously encoded block. To manage the motion information of the encoded block, a table-type buffer may be kept the same during the encoding and decoding process. The buffer of the history-based merge candidate may be initialized for each coding tree unit (CTU) line for parallelization. A buffer size of the history-based merge candidate may be defined as 5. Up to five history-based merge candidates may be configured into a table.

When a new history-based merge candidate is added to the buffer, the buffer may be managed using a First In First Out (FIFO) method. It may be determined whether there is overlapping motion information between motion information to be added to the buffer of the history-based merge candidate and motion information existing in the buffer. If there is no overlapping motion information, motion information input first may be removed from the buffer and new motion information may be added. If there is overlapping motion information, the overlapping motion information in the buffer may be moved to the first input position (First In) of the buffer. The remaining motion information in the buffer may be shifted and the motion information in the buffer may be reconfigured.

Referring to FIG. 9, the buffer of the history-based merge candidate may include HMVP0, HMVP1, HMVP2, HMVP3, and HMVP4. Indexes 0, 1, 2, 3, and 4 may be assigned to HMVP0, HMVP1, HMVP2, HMVP3, and HMVP4, respectively. The motion information HMVP1 to be added to the buffer of the history-based merge candidate may be checked whether there is overlapping motion information in the buffer. The motion information HMVP1 to be added may overlap the motion information HMVP1 to which index 1 is assigned in the buffer. The overlapping motion information HMVP1 may be moved to the position to which index 4 is assigned, which is the first position in the buffer. The motion information HMVP2, HMVP3 and HMVP4 may be shifted. History-based merge candidates may be added to the merge candidate list. Here, a redundancy check may be performed between the history-based merge candidate and the merge candidate in the merge candidate list. To reduce the complexity of the redundancy check, the redundancy check may only be performed between candidates with indices 3 and 4 of the history-based merge candidate and two spatial merge candidates in the merge candidate list. However, the present disclosure is not limited to these embodiments. History-based merge candidates may be filled in the merge candidate list up to the maximum allowable number of merge candidate lists minus 1. For example, if the maximum number of merge candidate lists is 6, up to 5 history-based merge candidates may be filled in the merge candidate list. However, the present disclosure is not limited to these embodiments.

Hereinafter, the pairwise average merge candidate deriving method is described. The pairwise average merge candidate may correspond to motion information generated by averaging motion vectors of candidate pairs existing in the merge candidate list. The pairwise average merge candidate may be filled into the merge candidate list if the merge candidate list is not filled with spatial merge candidates, temporal merge candidates, and history-based merge candidates. The pairwise average merge candidate may be generated by averaging motion information for each direction of the candidate pair. If two pieces of motion information exist for each direction, motion information may be generated by averaging the two pieces of motion information. If only single motion information exists, the single motion information may be used as is.

Hereinafter, a method for deriving a zero motion vector merge candidate is described. Zero motion vector merge candidates may be filled into the merge candidate list if the merge candidate list is not filled with spatial merge candidates, temporal merge candidates, history-based merge candidates, and pairwise average merge candidates. The zero motion vector merge candidate may have a motion vector corresponding to 0.

Figure 10:
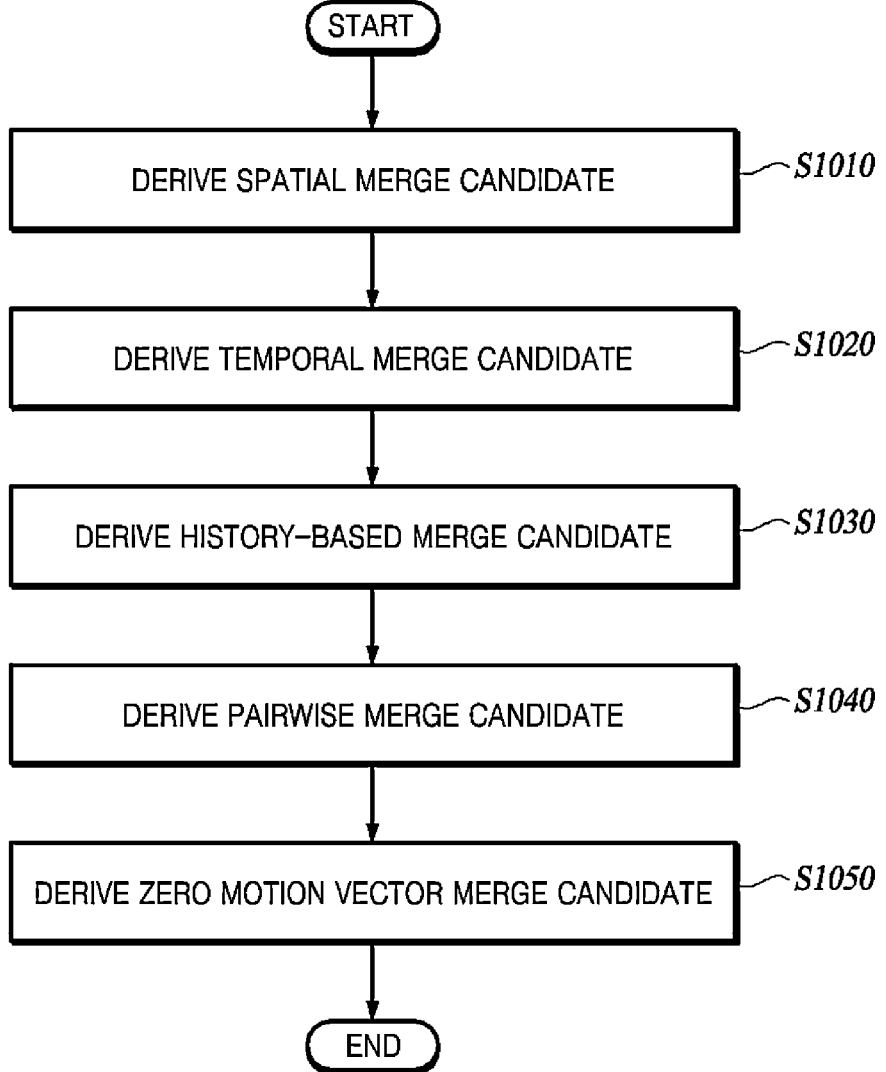
FIG. 10 is a diagram illustrating a process of configuring a merge candidate list, according to an embodiment of the present disclosure.

FIG. 10 is a diagram illustrating a process of configuring a merge candidate list according to an embodiment of the present disclosure.

Referring to FIG. 10, a spatial merge candidate may be derived to configure a merge candidate list (S1010). Up to four spatial merge candidates may be added to the merge candidate list. A temporal merge candidate may be derived to configure a merge candidate list (S1020). Up to one temporal merge candidate may be added to the merge candidate list. A history-based merge candidate may be derived to configure a merge candidate list (S1030). Up to five history-based merge candidates may be added to the merge candidate list. A pairwise average merge candidate may be derived to configure a merge candidate list (S1040). The pairwise average merge candidate may be filled into the merge candidate list if the merge candidate list is not filled with the spatial merge candidates, the temporal merge candidates, and the history-based merge candidates. A zero motion vector merge candidate may be derived to configure a merge candidate list (S1050). The zero motion vector merge candidate may be filled in the merge candidate list if the merge candidate list is not filled with the spatial merge candidates, the temporal merge candidates, the history-based merge candidates, and the pairwise average merge candidates.

Figure 11:
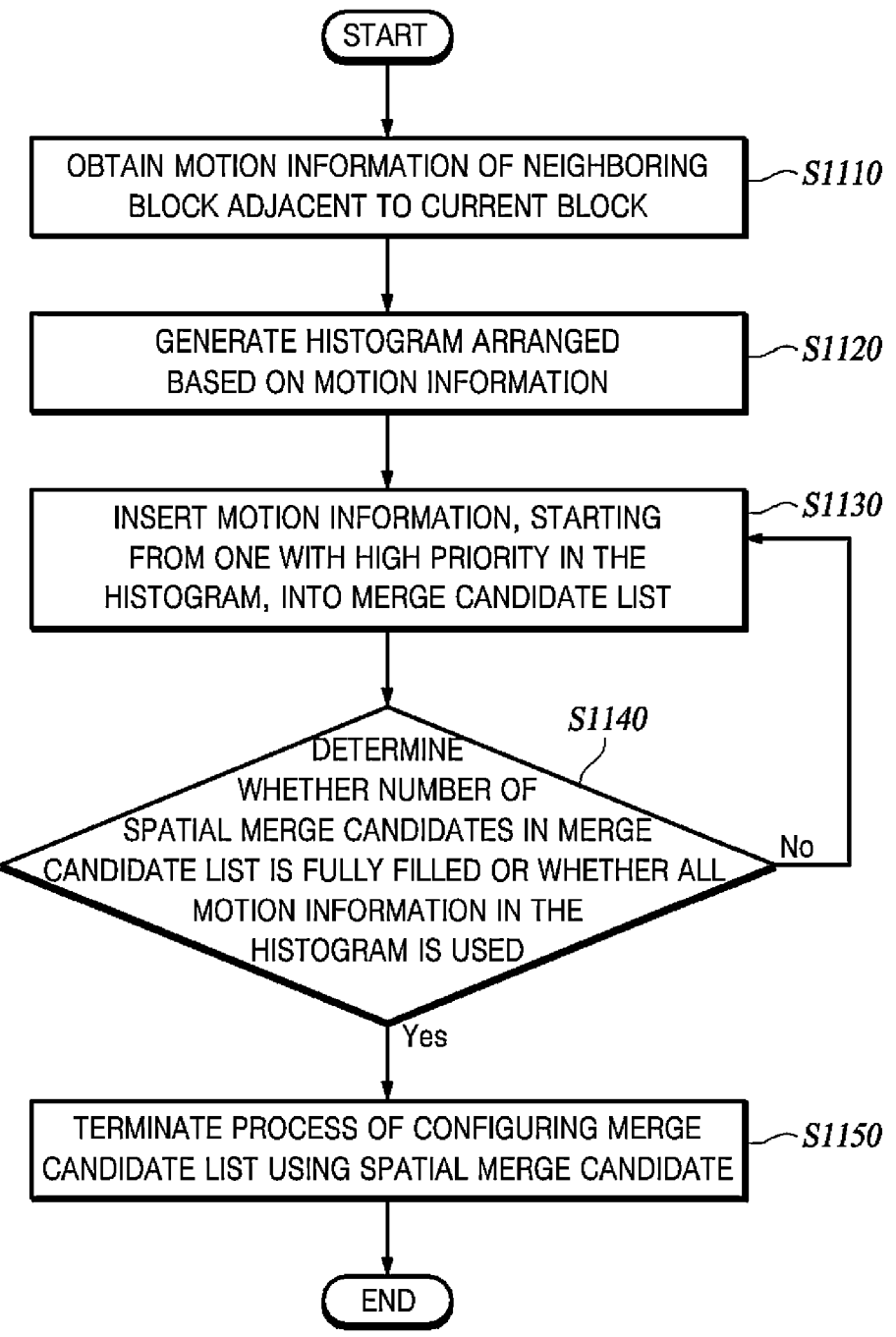
FIG. 11 is a diagram illustrating a process of configuring a merge candidate list using priority-based spatial merge candidates, according to an embodiment of the present disclosure.

FIG. 11 is a diagram illustrating a process of configuring a merge candidate list using a priority-based spatial merge candidate, according to an embodiment of the present disclosure.

Referring to FIG. 11, motion information of neighboring blocks adjacent to a current block may be obtained (S1110). The neighboring blocks adjacent to the current block may correspond to blocks A0, A1, B0, B1, and B2 in FIG. 6. Alternatively, the neighboring blocks adjacent to the current block may correspond to any blocks adjacent to the current block. The number of neighboring blocks may be any number. A histogram arranged based on motion information may be generated (S1120). A histogram arranged according to the frequency of occurrence of motion information may be generated. The frequency of occurrence of motion information having the same motion information may increase. The corresponding motion information may have priority. If there is motion information with the same frequency of occurrence in the generated histogram, the priority of the motion information may be determined based on the search order of the neighboring blocks adjacent to the current block.

Motion information, starting from one with a high priority in the histogram, may be inserted into the merge candidate list (S1130). Motion information with high priority in the histogram may correspond to motion information with a high frequency of occurrence. It may be determined whether the number of spatial merge candidates in the merge candidate list is fully filled or whether all motion information in the histogram is used (S1140). If the number of spatial merge candidates in the merge candidate list is fully filled or all motion information in the histogram is used (S1140—YES), the process of configuring a merge candidate list using spatial merge candidates may be terminated (S1150). If the number of spatial merge candidates in the merge candidate list is not all filled and all the motion information in the histogram is not used (S1140—NO), motion information, starting from one with the highest priority in the histogram, may be inserted into the merge candidate list (S1130). Instead of removing merge candidates having the same motion information from the merge candidate list through redundancy check among spatial merge candidates, a merge candidate list may be configured using spatial merge candidates according to the present disclosure. Coding efficiency may be improved by placing motion information with high priority in the histogram first in the merge candidate list. In addition, in the present disclosure, complexity may be reduced because the redundancy check process is omitted.

Figure 12:
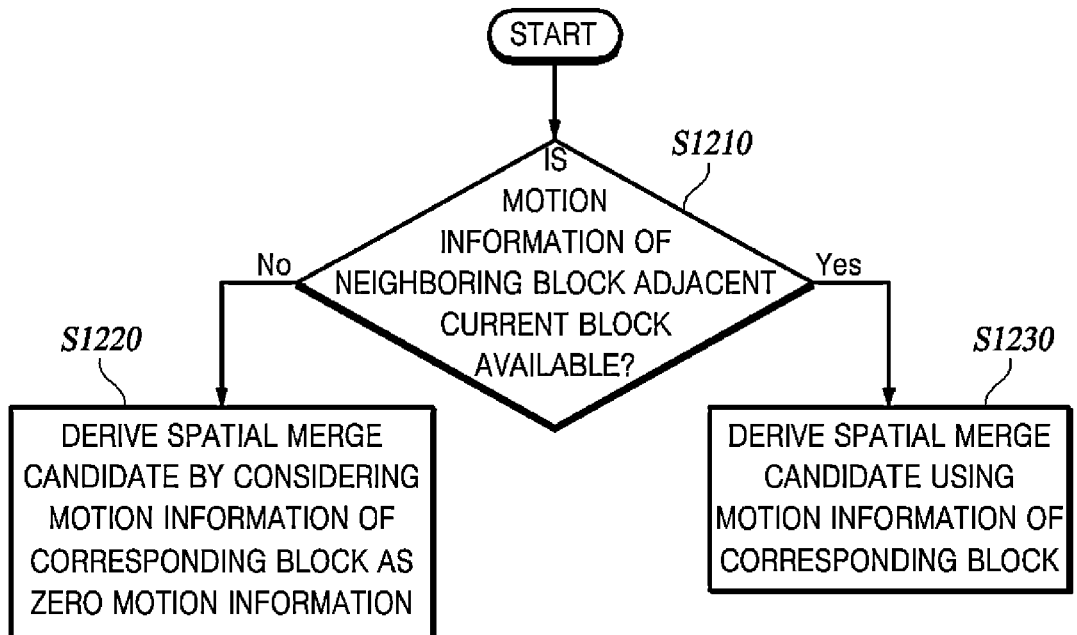
FIG. 12 is a diagram illustrating a process of deriving a spatial merge candidate using zero motion information, according to an embodiment of the present disclosure.

FIG. 12 is a diagram illustrating a process of deriving a spatial merge candidate using zero motion information, according to an embodiment of the present disclosure. If motion information of neighboring blocks adjacent to the current block is not available, a spatial merge candidate may be derived using only motion information of available blocks. Here, a case in which the motion information of neighboring blocks adjacent to the current block cannot be used may correspond to a case in which the neighboring blocks are in the intra prediction mode, intra block copy mode, or palette mode or a case in which the neighboring blocks exist in another parallel merge region. If the motion information of the neighboring blocks adjacent to the current block is not available, a spatial merge candidate may be derived by considering the motion information of the corresponding blocks as zero motion information. A motion vector of the zero motion information may correspond to 0.

Referring to FIG. 12, it may be determined whether motion information of a neighboring block adjacent to the current block is available (S1210). If motion information of the neighboring block adjacent to the current block is not available (S1210—NO), a spatial merge candidate may be derived by considering the motion information of the corresponding block as zero motion information (S1220). Here, the zero motion information may be given priority according to the frequency of occurrence within the histogram. A position of zero motion information in the merge candidate list may be variably adjusted depending on priority. Coding efficiency may be improved by variably adjusting the position of the zero motion information in the merge candidate list. A motion vector of the zero motion information may correspond to 0. If the motion information of the neighboring block adjacent to the current block is available (S1210—YES), a spatial merge candidate may be derived using the motion information of the corresponding block (S1230).

Figure 13:
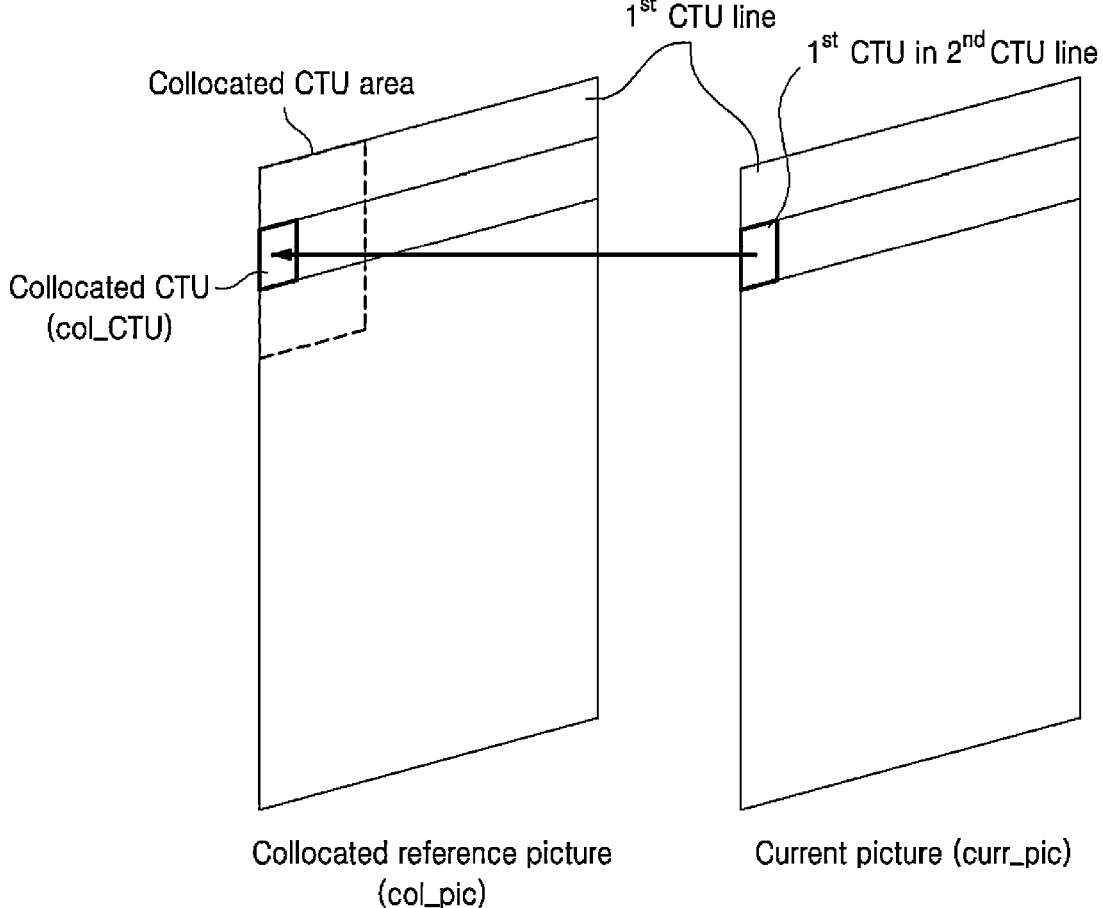
FIG. 13 is a diagram illustrating a method of managing a buffer of a history-based merge candidates for each coding tree unit line, according to an embodiment of the present disclosure.

FIG. 13 is a diagram illustrating a method of managing a buffer of a history-based merge candidate for each coding tree unit (CTU) line, according to an embodiment of the present disclosure. When performing decoding of a CTU line within a picture, a surrounding region of a temporal neighboring block within the picture including the temporal neighboring block may be determined as the corresponding CTU region. A history-based merge candidate buffer may be configured with motion information existing within the corresponding CTU region. In this case, a size of the corresponding CTU region may be determined variously, starting from the size of at least one CTU. The method for managing the buffer of history-based merge candidates according to the present disclosure may be applied only to a first CTU of each CTU line. Motion information may be sequentially filled in the buffer, while searching the corresponding CTU region in a predetermined random order. Here, the random order may correspond to a raster scan order or a zig-zag scan order. The buffer may be configured in a way that increases the priority according to the frequency of occurrence of motion information in the corresponding CTU region.

Referring to FIG. 13, a history-based merge candidate buffer may be configured for a first CTU of a second CTU line in the current picture curr_pic. There may be a temporal neighboring block col_CTU of the first CTU in the second CTU line. There may be a picture col_pic including a temporal neighboring block col_CTU. In the picture col_pic including the temporal neighboring block col_CTU, a certain region surrounding the temporal neighboring block col_CTU may be set as a corresponding CTU region (collocated CTU region). A history-based merge candidate buffer for the first CTU of the second CTU line may be configured with motion information existing in the collocated CTU region. The collocated CTU region may be searched in a certain order. The buffer may be configured to increase priority according to the frequency of occurrence of movement within the collocated CTU region. The method for configuring a history-based merge candidate buffer according to the present disclosure allows the use of a history-based merge candidate when the history-based merge candidate cannot be used due to initialization of the history-based merge candidate buffer in a new CTU line. According to the present disclosure, coding efficiency may be improved because a merge candidate list is configured by efficiently configuring a history-based merge candidate buffer.

Figure 14:
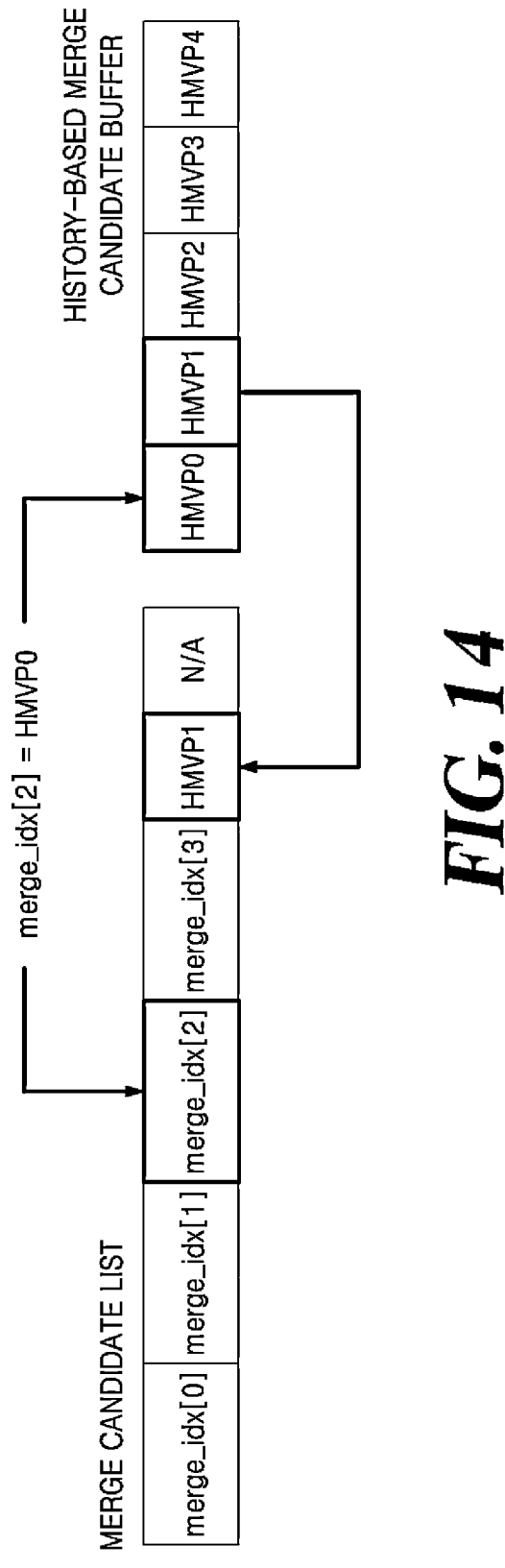
FIG. 14 is a diagram illustrating a process of configuring a merge candidate list using history-based merge candidates, according to an embodiment of the present disclosure.

FIG. 14 is a diagram illustrating a process of configuring a merge candidate list using history-based merge candidates according to an embodiment of the present disclosure. Each motion information in the history-based merge candidate buffer may be compared with motion information in the merge candidate list. Duplicate motion information may not be added to the merge candidate list, and only non-duplicate motion information may be added to the merge candidate list.

Referring to FIG. 14, motion information HMVP0, HMVP1, HMVP2, HMVP3, and HMVP4 may exist in the history-based merge candidate buffer. The motion information HMVP0 may overlap motion information corresponding to merge_idx[2] in the merge candidate list. In this case, motion information HMVP0 may not be added to the merge candidate list. The motion information HMVP1 may not overlap the motion information in the merge candidate list. In this case, the motion information HMVP1 may be added as a fifth merge candidate in the merge candidate list.

Figure 15:
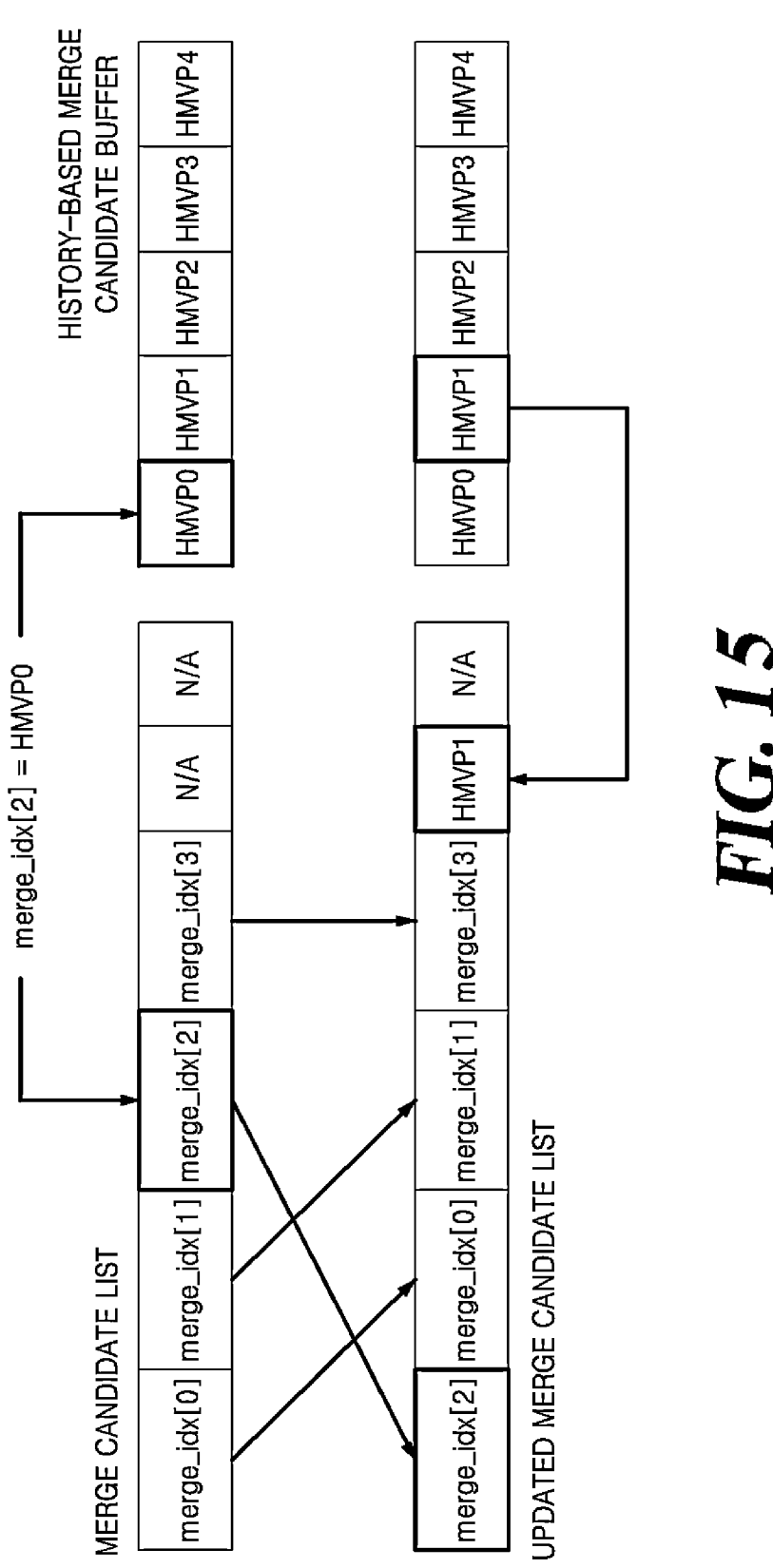
FIG. 15 is a diagram illustrating a process of configuring a merge candidate list using history-based merge candidates, according to another embodiment of the present disclosure.

FIG. 15 is a diagram illustrating a process of configuring a merge candidate list using history-based merge candidates according to another embodiment of the present disclosure. Each motion information in the history-based merge candidate buffer may be compared with the motion information in the merge candidate list. Through a redundancy check, the priority of overlapping motion information in the merge candidate list may increase. Accordingly, the merge candidate list may be rearranged. The overlapping motion information may be located in a first merge candidate in the merge candidate list. When the merge candidate list is rearranged, the merge candidate list may be rearranged considering the frequency of occurrence of each motion information. The position may be changed only when the frequency of occurrence of the overlapping motion information is large, and the position may not be changed when the frequency of occurrence of the overlapping motion information is small or the same.

Referring to FIG. 15, motion information HMVP0, HMVP1, HMVP2, HMVP3, and HMVP4 may exist in the history-based merge candidate buffer. The motion information HMVP0 may overlap motion information corresponding to merge_idx[2] in the merge candidate list. In this case, the motion information corresponding to merge_idx[2] may have a higher priority and may be located in a first merge candidate in the merge candidate list. The motion information HMVP1 may not overlap the motion information in the merge candidate list. In this case, the motion information HMVP1 may be added as a fifth merge candidate in the merge candidate list. The method of configuring a merge candidate list using a history-based merge candidate according to the present disclosure may improve coding efficiency because overlapping motion information is rearranged and given priority in the merge candidate list.

FIG. 16 is a diagram illustrating a video decoding process according to an embodiment of the present disclosure.

Referring to FIG. 16, a spatial merge candidate may be derived based on neighboring blocks spatially adjacent to the current block (S1610). A motion information list may be generated based on the motion information of neighboring blocks spatially adjacent to the current block and the frequency of occurrence of the motion information. Here, the motion information list may correspond to a histogram. Based on the fact that the motion information of neighboring blocks spatially adjacent to the current block cannot be used, the motion information may be considered as zero motion information. The zero motion information may include a zero motion vector. A temporal merge candidate may be derived based on neighboring blocks temporally adjacent to the current block (S1620). A first merge candidate list may be generated based on the spatial merge candidate and the temporal merge candidate (S1630). Motion information, starting from one having a high priority in the motion information list, may be added to the first merge candidate list. The motion information with a high priority may correspond to motion information with a high frequency of occurrence. A first merge candidate list may be generated based on the priority of zero motion information.

A history-based merge candidate may be derived based on the motion information of the block encoded before the current block (S1640). Surrounding regions of neighboring blocks temporally adjacent to the current block may be searched in a random order. A buffer may be configured based on the motion information in the surrounding region and the frequency of occurrence of the motion information. The buffer may correspond to a history-based merge candidate buffer. A second merge candidate list may be generated based on the first merge candidate list and the history-based merge candidate (S1650). Motion information in the first merge candidate list may be compared with motion information of the history-based merge candidate. Based on the fact that the motion information in the first merge candidate list and the motion information of the history-based merge candidate are the same, the position of the motion information in the second merge candidate list may be changed. The same motion information may be located in the first merge candidate in the second merge candidate list. A prediction block of the current block may be generated based on the second merge candidate list (S1660). The first merge candidate list and the second merge candidate list may be generated based on the priority of motion information. The priority of motion information may be determined based on the frequency of occurrence of motion information. If all merge candidates in the second merge candidate list are not filled based on the first merge candidate list and the history-based merge candidate, a pairwise average merge candidate may be derived. The pairwise average merge candidate may be added to the second merge candidate list. If all merge candidates in the second merge candidate list are not filled based on the first merge candidate list, the history-based merge candidate, and the pairwise average merge candidate, a zero motion vector merge candidate may be derived. The zero motion vector merge candidate may be added to the second merge candidate list.

FIG. 17 is a diagram illustrating a video encoding process according to an embodiment of the present disclosure.

Referring to FIG. 17, a spatial merge candidate may be determined based on neighboring blocks spatially adjacent to the current block (S1710). A motion information list may be generated based on motion information of neighboring blocks spatially adjacent to the current block and the frequency of occurrence of the motion information. Here, the motion information list may correspond to a histogram. Based on the fact that the motion information of neighboring blocks spatially adjacent to the current block cannot be used, the motion information may be considered as zero motion information. The zero motion information may include a zero motion vector. A temporal merge candidate may be determined based on neighboring blocks temporally adjacent to the current block (S1720). A first merge candidate list may be generated based on the spatial merge candidate and the temporal merge candidate (S1730). The motion information, starting from one with the highest priority in the motion information list, may be added to the first merge candidate list. The motion information with high priority may correspond to motion information with a high frequency of occurrence. A first merge candidate list may be generated based on the priority of zero motion information.

A history-based merge candidate may be determined based on the motion information of the block encoded before the current block (S1740). Surrounding regions of neighboring blocks temporally adjacent to the current block may be searched in a random order. A buffer may be configured based on the motion information in the surrounding region and the frequency of occurrence of the motion information. The buffer may correspond to a history-based merge candidate buffer. A second merge candidate list may be generated based on the first merge candidate list and the history-based merge candidate (S1750). Motion information in the first merge candidate list may be compared with motion information of the history-based merge candidate. Based on the fact that the motion information in the first merge candidate list and the motion information of the history-based merge candidate are the same, a position of the motion information in the second merge candidate list may change. The same motion information may be located in a first merge candidate in the second merge candidate list. A prediction block of the current block may be generated based on the second merge candidate list (S1760). The first merge candidate list and the second merge candidate list may be generated based on the priority of motion information. The priority of motion information may be determined based on the frequency of occurrence of motion information. If all merge candidates in the second merge candidate list are not filled based on the first merge candidate list and the history-based merge candidate, a pairwise average merge candidate may be determined. The pairwise average merge candidate may be added to the second merge candidate list. If all merge candidates in the second merge candidate list are not filled based on the first merge candidate list, the history-based merge candidate, and the pairwise average merge candidate, a zero motion vector merge candidate may be determined. The zero motion vector merge candidate may be added to the second merge candidate list.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMBER

122: intra predictor
510: entropy decoder
542: intra predictor

24

What is claimed is:

1. A video decoding method comprising:
determining spatial merge candidates, based on neighboring blocks spatially adjacent to a current block;
determining a temporal merge candidate, based on neighboring blocks temporally adjacent to the current block;
generating a first merge candidate list based on the spatial merge candidate and the temporal merge candidate;
determining a history-based merge candidate, based on motion information of a block encoded before the current block;
generating a second merge candidate list, based on the first merge candidate list and the history-based merge candidate; and
generating a prediction block of the current block, based on the second merge candidate list,
wherein the first merge candidate list and the second merge candidate list are generated based on a priority of motion information,
wherein generating the second merge candidate comprises:
comparing motion information in the first merge candidate list with motion information of the history-based merge candidate, and
changing a position of motion information in the second merge candidate list, based on that the motion information in the first merge candidate list and the motion information of the history-based merge candidate are the same.

2. The video decoding method of claim 1, wherein determining the spatial merge candidates comprises:
generating a motion information list, based on motion information of the neighboring blocks spatially adjacent to the current block and a frequency of occurrence of the motion information of the neighboring blocks spatially adjacent to the current block.

3. The video decoding method of claim 2, wherein generating the first merge candidate list comprises:
generating the first merge candidate list by adding motion information, starting from motion information with a high priority in the motion information list.

4. The video decoding method of claim 1, wherein deriving the spatial merge candidate comprises:
determining the spatial merge candidate by considering motion information of the neighboring blocks spatially adjacent to the current block as zero motion information, based on that the motion information of the neighboring blocks spatially adjacent to the current block is not available.

5. The video decoding method of claim 4, wherein generating the first merge candidate list comprises:
generating the first merge candidate list, based on a priority of the zero motion information.

6. The video decoding method of claim 1, wherein determining the history-based merge candidate comprises:
searching surrounding regions of the neighboring blocks temporally adjacent to the current block in a random order, and
configuring a buffer, based on motion information in the surrounding regions and a frequency of occurrence of the motion information in the surrounding regions.

7. The video decoding method of claim 1, further comprising:
when all merge candidates in the second merge candidate list are not filled based on the first merge candidate list and the history-based merge candidate, determining a
pairwise average merge candidate; and
adding the pairwise average merge candidate to the sec-
ond merge candidate list.

8. The video decoding method of claim 7, further com-
prising:
when all merge candidates in the second merge candidate
list are not filled based on the first merge candidate list,
the history-based merge candidate, and the pairwise
average merge candidate, determining a zero motion
vector merge candidate; and
adding the zero motion vector merge candidate to the
second merge candidate list.

9. The video decoding method of claim 1, wherein the
priority of the motion information is determined based on a
frequency of occurrence of the motion information.

10. A video encoding method comprising:
determining spatial merge candidates, based on neighbor-
ing blocks spatially adjacent to a current block;
determining a temporal merge candidate, based on neigh-
boring blocks temporally adjacent to the current block;
generating a first merge candidate list based on the spatial
merge candidate and the temporal merge candidate;
determining a history-based merge candidate, based on
motion information of a block encoded before the
current block;
generating a second merge candidate list, based on the
first merge candidate list and the history-based merge
candidate; and
generating a prediction block of the current block, based
on the second merge candidate list,
wherein the first merge candidate list and the second
merge candidate list are generated based on a priority
of motion information,
wherein generating the second merge candidate list com-
prises:
comparing motion information in the first merge can-
didate list with motion information of the history-
based merge candidate, and
changing a position of motion information in the sec-
ond merge candidate list, based on that the motion
information in the first merge candidate list and the
motion information of the history-based merge can-
didate are the same.

11. The video encoding method of claim 10, wherein
determining the spatial merge candidates comprises:
generating a motion information list, based on motion
information of the neighboring blocks spatially adja-
cent to the current block and a frequency of occurrence
of the motion information of the neighboring blocks
spatially adjacent to the current block.

12. The video encoding method of claim 11, wherein
generating the first merge candidate list comprises:
generating the first merge candidate list by adding motion
information, starting from motion information with a
high priority in the motion information list.

13. The video encoding method of claim 10, wherein
determining the spatial merge candidates comprising:
determining the spatial merge candidate by considering
motion information of the neighboring blocks spatially
adjacent to the current block as zero motion informa-
tion, based on that the motion information of the
neighboring blocks spatially adjacent to the current
block is not available.

14. The video encoding method of claim 13, wherein
generating the first merge candidate list comprises:
generating the first merge candidate list, based on a
priority of the zero motion information.

15. The video encoding method of claim 10, wherein
determining the history-based merge candidate comprises:
searching surrounding regions of the neighboring blocks
temporally adjacent to the current block in a random
order, and
configuring a buffer, based on motion information in the
surrounding regions and a frequency of occurrence of
the motion information in the surrounding regions.

16. The video encoding method of claim 10, further
comprising:
when all merge candidates in the second merge candidate
list are not filled based on the first merge candidate list
and the history-based merge candidate, determining a
pairwise average merge candidate; and
adding the pairwise average merge candidate to the sec-
ond merge candidate list.

17. The video encoding method of claim 16, further
comprising:
when all merge candidates in the second merge candidate
list are not filled based on the first merge candidate list,
the history-based merge candidate, and the pairwise
average merge candidate, determining a zero motion
vector merge candidate; and
adding the zero motion vector merge candidate to the
second merge candidate list.

18. A method for providing a video decoding apparatus
with video data, the method comprising:
encoding the video data into a bitstream; and
transmitting the bitstream to the video decoding appara-
tus,
wherein encoding the video data comprises:
determining spatial merge candidates, based on neigh-
boring blocks spatially adjacent to a current block;
determining a temporal merge candidate, based on
neighboring blocks temporally adjacent to the cur-
rent block;
generating a first merge candidate list based on the
spatial merge candidate and the temporal merge
candidate;
determining a history-based merge candidate, based on
motion information of a block encoded before the
current block;
generating a second merge candidate list, based on the
first merge candidate list and the history-based
merge candidate; and
generating a prediction block of the current block,
based on the second merge candidate list,
wherein the first merge candidate list and the second
merge candidate list are generated based on a priority
of motion information,
wherein generating the second merge candidate com-
prises:
comparing motion information in the first merge can-
didate list with motion information of the history-
based merge candidate, and
changing a position of motion information in the sec-
ond merge candidate list, based on that the motion
information in the first merge candidate list and the
motion information of the history-based merge can-
didate are the same.

* * * * *